…

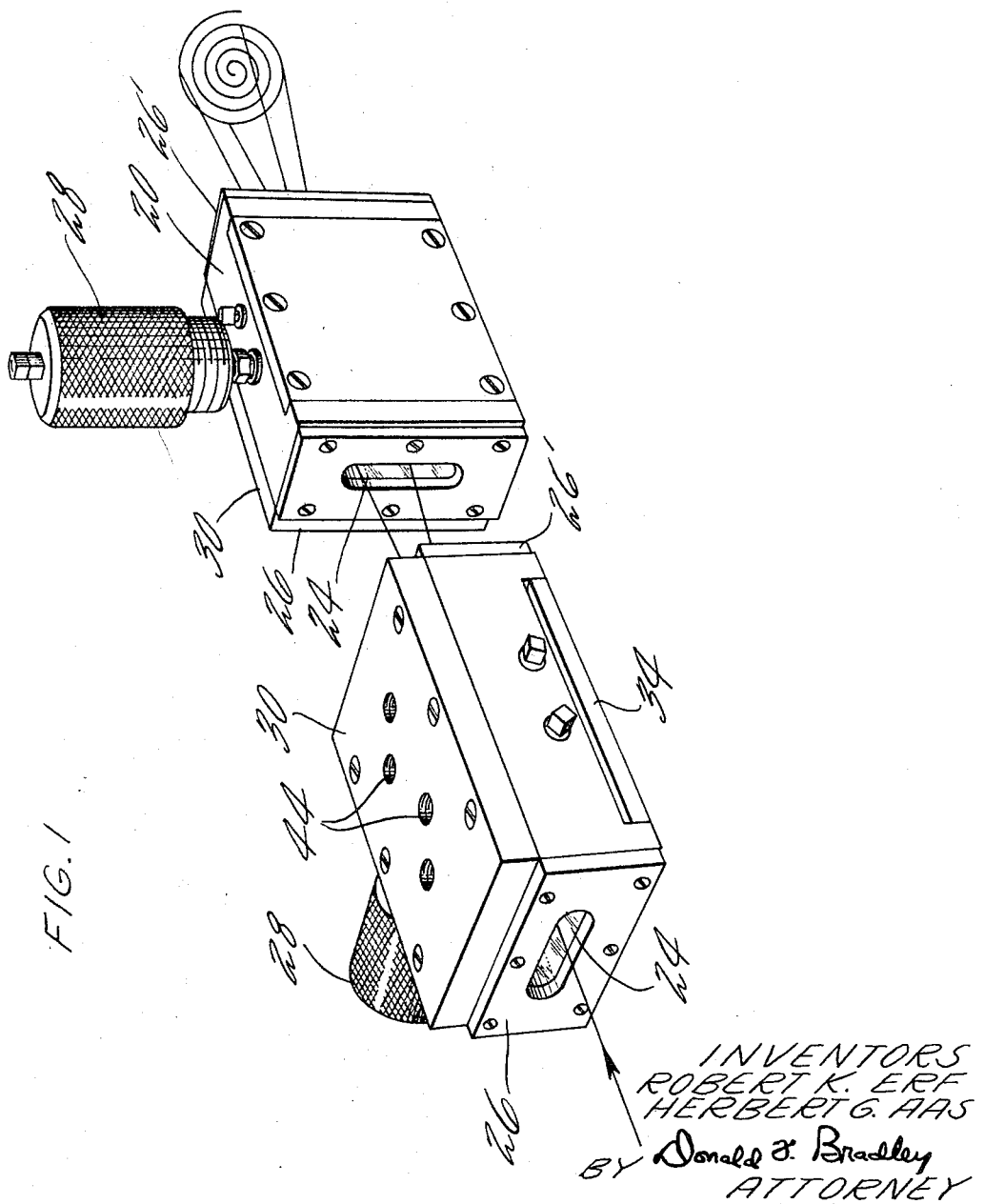

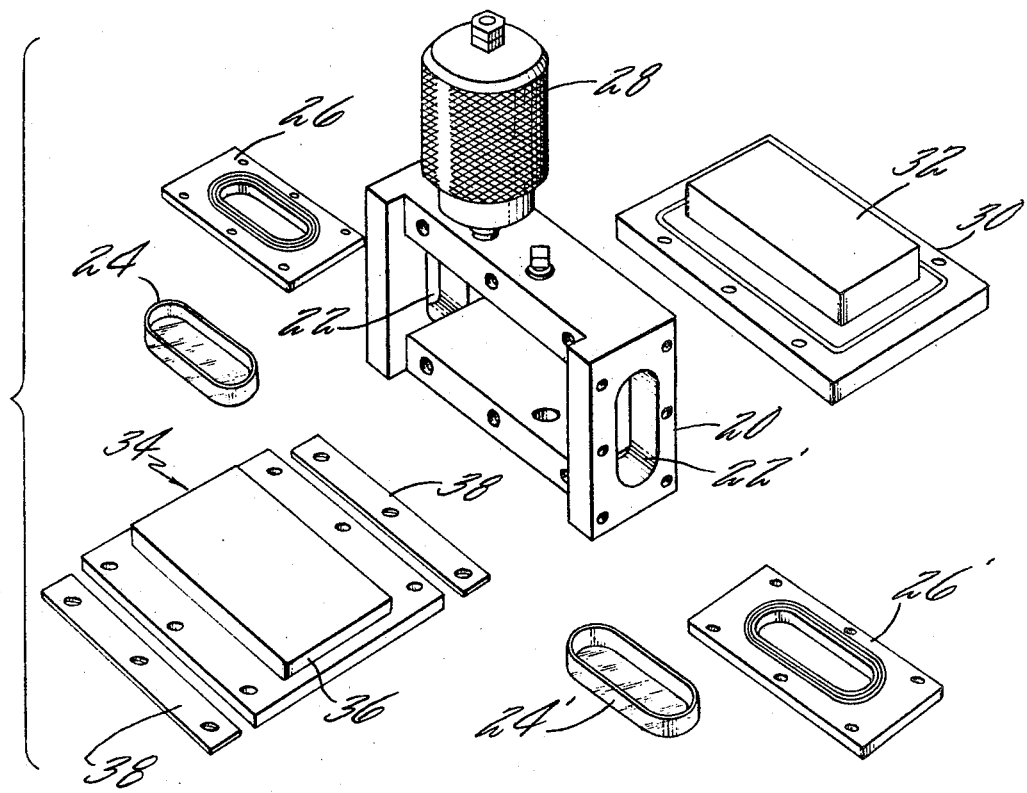
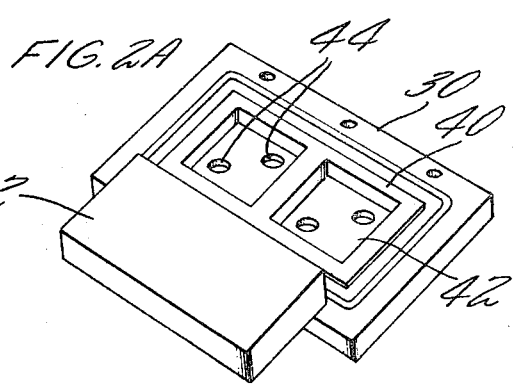
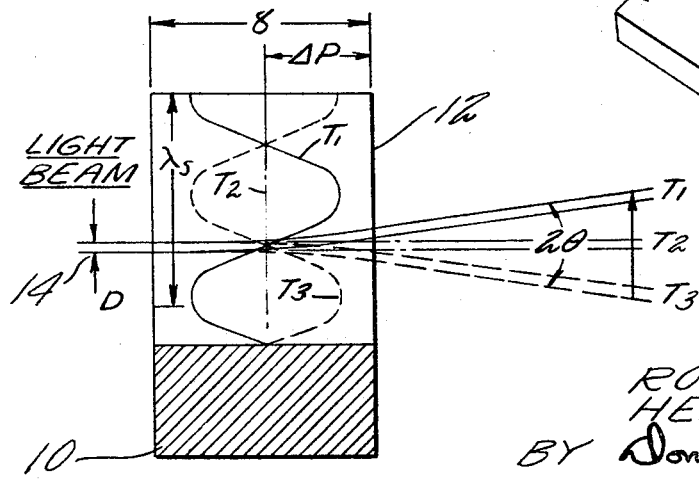

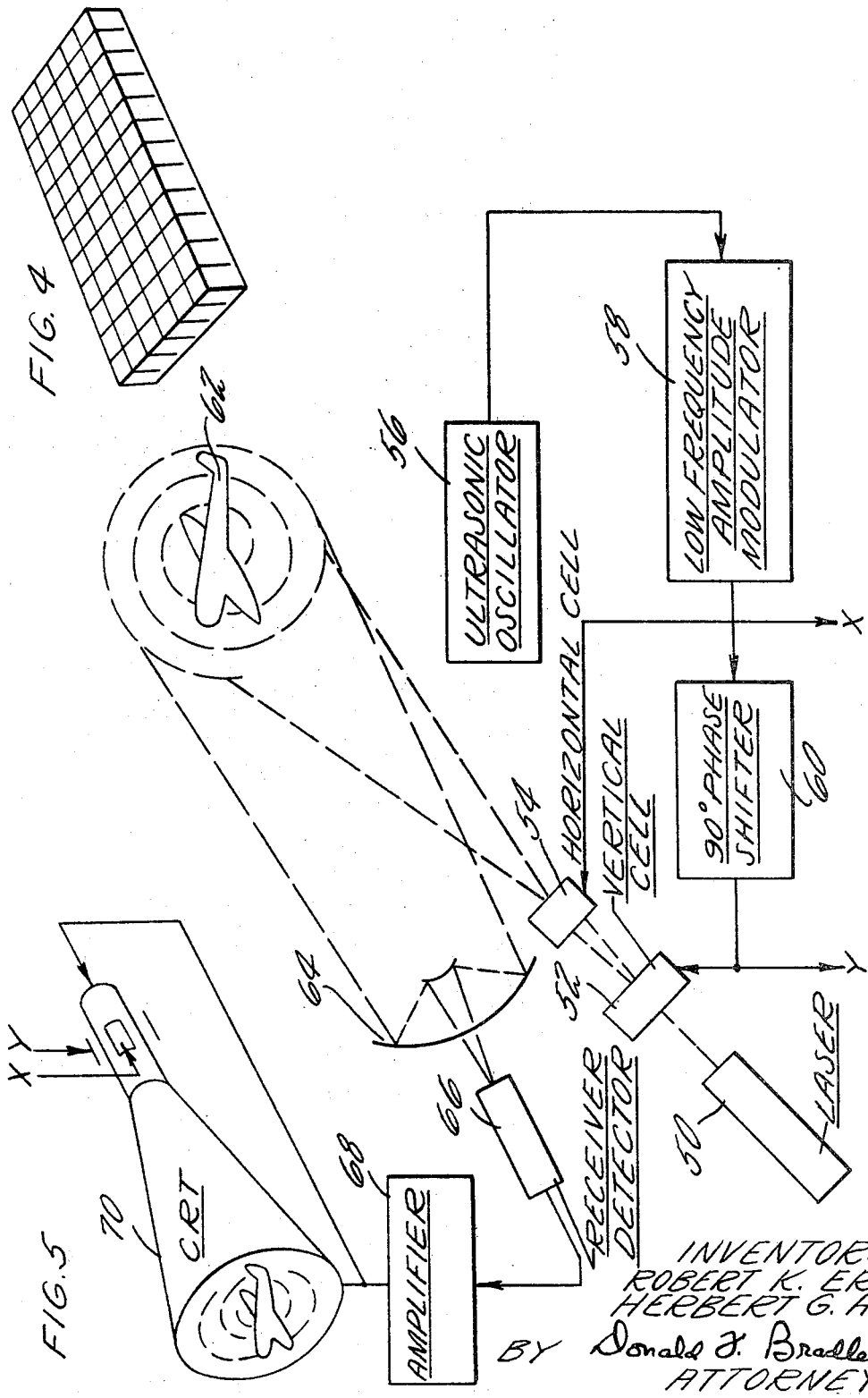

United States Patent Office 3,399,013
Patented Aug. 27, 1968

3,399,013
ULTRASONIC SCANNING CELL
Herbert G. Aas, East Hartford, and Robert K. Erf, Glastonbury, Conn., assignors to United Aircraft Corporation, East Hartford, Conn., a corporation of Delaware
Filed Oct. 28, 1964, Ser. No. 407,082
7 Claims. (Cl. 350—161)

ABSTRACT OF THE DISCLOSURE

An ultrasonic cell for optically deflecting a light beam, and comprising an enclosed chamber containing a light transparent medium and a transducer for generating a standing acoustical wave in the medium.

---

This invention relates to apparatus for periodically and nonmechanically deflecting a light beam, and particularly to an ultrasonic optical beam scanning cell which provides large angular deflections to a laser beam. Two ultrasonic deflection cells may be used to deflect the laser beam in an orderly fashion to sequentially illuminate a two-dimensional area.

The rapid development in the laser technology field during the past few years has led to many practical applications of rapid, nonmechanical optical scanning systems. A prime requirement of such active optical systems is some means to accurately control the direction of a beam of light. It has long been recognized that one means for achieving such control is utilization of the principle that a light beam will be refracted in passing through a density gradient. Previous work on ultrasonic optical beam scanning cells has been relatively unsuccessful in that the maximum obtainable beam deflection was substantially less than one degree.

This invention avoids the difficulties of prior work on ultrasonic beam scanning cells by providing a novel cell design through which light beams can be nonmechanically deflected through angles of several degrees by establishing, ultrasonically, a time varying refractive index gradient in a suitable medium. In addition, an active optical imaging system is described, the system employing two ultrasonic deflection cells which provide periodic two-dimensional field illumination.

These results are achieved by providing a suitable density gradient by establishing an ultrasonic standing wave, thereby generating a time varying density disturbance, in a transparent, refractivem aterial. In this manner a time-varying refractive index gradient is created which will deflect a light beam back and forth at the ultrasonic driving frequency. If the beam is small in diameter relative to the sonic wavelength the divergence of the light beam will not be significantly affected and if it is directed through a pressure nodal plane of a sinusoidal standing wave the light beam deflection will be sinusoidal.

It is therefore an object of this invention to provide an ultrasonic optical beam scanning cell providing large angular deflections.

Another object of this invention is an ultrasonic optical beam scanning cell which does not distort the light beam, which permits adjustments to resonance, which eliminates leaks and is explosion proof.

A further object of this invention is an ultrasonic optical beam scanning cell utilizing a liquid in which the transducer for generating standing waves within the liquid is internally mounted.

Another object of this invention is a novel mosaic transducer for use in an ultrasonic cell to eliminate cross coupling within the transducer with minimum intensity variations along the ultrasonic wave front.

A still further object of this invention is an active optical imaging system employing two ultrasonic deflection cells which provide periodic two-dimensional field illumination.

These and other objects of the invention may be better understood by referring to the following description and claims, read in conjunction with the accompanying drawings, in which:

FIGURE 1 is a view of two ultrasonic cells assembled and oriented for producing beam scanning; and FIGURE 2 shows a disassembled liquid ultrasonic deflection cell; and FIGURE 2a shows the disassembled transducer end plate of FIGURE 2; and FIGURE 3 is a schematic drawing illustrating the operation of the ultrasonic scanning cell; and FIGURE 4 shows the sectional transducer used in conjunction with the cell; and FIGURE 5 is a block diagram of an optical imaging system utilizing the cells.

The basic physical principle upon which the optical beam scanning cell operates is that a beam of light in passing through a density gradient normal to the direction of light propagation will be bent towards the region of higher index of refraction. Thus, by setting up an ultrasonic standing wave in a refractive medium, a time varying sinusoidal density gradient will be established which will alternately refract a light beam, passing through a pressure nodal plane, back and forth at the ultrasonic driving frequency. The angular deflection $\theta$ that a light beam will be deviated in traversing a sonic field is directly proportional to the path length $\delta$ in the field; the acoustic pressure variation $\Delta P$; the compressibility $k$ of the material; and an optical index of refraction term $$(n^2-1)(n^2+2)/6n$$

and inversely proportional to the sonic wavelength $\lambda_s$.

If $\Delta P$ is a nonlinear function, such as a sinusoid, the light beam diameter must be sufficiently small in order that its entire diameter experience essentially the same index of refraction gradient if minimum divergence of the light beam is to be had. An acoustical standing wave cell configuration is more desirable than a traveling wave configuration because the variation of index of refraction gradient across the light beam is less, the density gradient is approximately doubled, and a standing wave also requires far less driving power. If the angle of deflection is sufficiently large that the deflection within the cell is significant, the light beam, as it passes through the cell, will experience a decreasing index of refraction gradient, and, therefore, there is a practical upper limit to the length of the cell.

FIGURE 3 is a schematic representation of an ultrasonic scanning cell in which a transducer 10, driven by means not shown, sets up a standing wave within the medium 12. At time $t$ the ultrasonic wave of wavelength $\lambda_s$ will have a pressure gradient as shown by curve $T_1$, and the beam will be bent as indicated at $T_1$. It should be noted that the curve $T_1$ represents the acoustical pressure gradient within the cell in which the portion of the curve to the right of the centerline illustrates regions of higher density and the portions of the curve to the left of the centerline illustrate regions of lower density. At a time equal to a quarter of a period later, the pressure gradient within the medium 12 is given by curve $T_2$, that is, there is no pressure gradient within the medium and the light beam is not deflected. Another quarter of a period later the pressure gradient is shown by curve $T_3$, this curve being 180° out of phase with original curve $T_1$, and the beam of light 14 is bent to a position as shown.

FIGURES 1 and 2 show the construction of the ultrasonic deflection cell. The entire cell except for the windows, the transducer and gaskets are made preferably of stainless steel. The main cell body 20 has two cutouts 22 and 22' for windows 24 and 24' to permit passage of the light beam. The windows are fitted into window retainers 26 and 26', the retainers being attached to the cell body 20. A pressurizing piston 28 is attached to a long side of the cell body 20. The function of the piston will be explained in detail later. A transducer 32 is mounted on end plate 30, the entire assembly being attached to one side of the cell body 20. The other side of the cell body comprises end plate 34 having an O-ring 36 which permits fine adjustments to achieve cell resonance through adjustment of the end block holding screws (not shown). Strips 38 are O-ring retainers. Coarse resonance adjustments are made through spacers of various thicknesses (not shown) which are inserted between the transducer end block 30 and the cell body 20 with the seal maintained by an O-ring in the O-ring groove (not shown) in the cell body to seal between the spacer and the cell body.

FIGURE 2a shows an unmounted transducer 32 with its associated end block 30. The transducer is operated in an air-backed mode by the use of a closed cell silicone sponge rubber gasket 40 as a pressure release. Further decoupling is achieved by undercutting the transducer end block 30 in pockets 42. The transducer 32 is bonded to the gasket 40 and the gasket 40 to the end plate with adhesive. The edge of the gasket may be protected from the liquid medium of the cell by applying several coats of a pliable cement. This may be necessary since the sponge rubber is not completely impervious to all liquids.

In assembly the inner transducer electrode is connected to the cell body and the outer electrode lead is brought out through a hole in the end block 44. These holes also permit back pressurization with air pressure when the cell internal pressure is high.

The preferred cell material is a liquid having a high index of refraction, but solids such as crystalline quartz or Lucite, or even water may be used. Tetrachloroethylene has been used because it is neither flammable as is carbon disulfide nor as toxic as carbon tetrachloride. Tetrachloroethylene is also a good wetting agent, allowing the cell to be filled easily and providing little trouble with trapped air or the adherence of gas bubbles to the inner surfaces.

In operation, the transducer 32 is actuated to establish a sonic standing wave between the transducer face and the opposite end block. Major tuning adjustments are accomplished by means of the spacers between the transducer end block 30 and the cell body, and fine adjustments may be made by compressing or decompressing an O-ring by means of the screws in the opposite end block 34.

Cavitation of the cell liquid is inhibited by operating the cell under pressure, which additionally aids in stabilizing the standing wave by firmly establishing the position of the transducer. Pressurization is accomplished through the actuation of piston 28 with a screw cap which is mounted on the top of the cell body 20.

The magnitude of the angle of deflection of the light or laser beam is primarily determined by the wavelength of the sound wave, the index of refraction of the fluid, and the peak pressures. The distortion of the light beam induced by the refraction for a sinusoidal density gradient set up by a sonic standing wave is a function of the ratio of the light beam diameter to the sonic wavelength. The preferred medium in the cell is selected for a velocity to provide the desired wavelength at the desired frequency to eliminate beam distortion, and with consideration given to the index of refraction and transmission characteristics of the medium.

The following table summarizes results obtained from studies of ultrasonic deflection cells driven in a compressional mode with an optical path length through the ultrasonic field of four inches or less.

| Material | Refractive index | Frequency (kc.) | Deflection (degrees) |
| --- | --- | --- | --- |
| Crystalline Quartz | 1.54 | 450 | 1.2 |
| Lucite | 1.50 | 100 | 0.2 |
| Water | 1.33 | 150 | 1.5 |
| Tetrachloroethylene | 1.50 | 120 | 2.2 |
|  |  | 147 | 3.5 |
|  |  | 326 | 6.0 |
| Tetrachloroethylene with mosaic transducer |  | 100 | 2.4 |

The amount of deflection resulting from use of solid media may be improved at higher frequencies. A liquid medium normally requires the use of lower ferquencies. The above results were obtained using a sinusoidal acoustic standing wave. It should be noted, however, that the preferred embodiment is the use of a triangular wave which results in a much more linear pressure gradient.

Neglecting some finite amplitude effects it is theoretically possible to produce a peak-to-peak deflection of 10° with available materials in a 4-inch long cell with a triangular standing wave.

The maximum deflection obtained experimentally with tetachloroethylene at 100 kc. is 2.4°. Of this amount, approximately 1.6° is due to the refractive index gradient with in the cell and the remainder results from the natural refraction at the glass-air interface upon emergence of the beam from the cell.

It has not been possible to design a ferroelectric transducer of a usable size which did not have unwanted modes existing at the frequency of the first thickness mode. The effect of the cross coupling is to reduce the density gradient and hence the light beam deflection and to increase the probability of turbulent streaming because of variation in the particle velocity along the wave front.

In order to allow operation of the transducer at its resonance, a mosaic transducer shown in FIGURE 4 is used in which the individual transducer elements have cross-sectional dimensions of less than ½ wavelength. The mosaic elements are formed by cutting only part way through the transducer body. For a transducer of 5×10 cm., the elements are approximately 8 mm. square. The electrodes of the cut surface are connected with an aluminum foil and conducting adhesive and this surface is bonded to the pressure release material. In this manner a plane surface is presented to the liquid. Experimentation has shown the Q of the mounted transducer as 52. It is therefore apparent that use of the mosaic or segmented transducer substantially improves the performance of the cell when used with a liquid medium and is consequently the preferred embodiment.

Preferred transducer materials are those with high Q's such as a lead-zirconate-titanate material PZT-4, which, in addition, is inexpensive and rugged. It is obvious that other transducer materials may be used.

Because of the sinusoidal nature of the density gradient, the angular deflection of the light beam will be nonlinear when an appreciable deflection occurs within the cell. In other words, as the beam is deflected it will experience a decreasing density gradient until, when it has been displaced by a quarter of a sonic wavelength in a transverse direction to the axis of a light beam, it will experience a gradient in the opposite direction.

One novel aspect of this cell is the tuning provided to the cell resonance by means of pressurizing via piston 28. The prime purpose of the pressurizing piston is to eliminate cavitation of the liquid in the cell, an expedient well known in the art. However, pressurization of the liquid also results in a small amount of squeezing of the gasket 40, and an increase in pressure lowers the frequency of cell resonance. Conversely, decreasing the pressure will raise the resonant frequency of the cell. In this manner, adjustment of the pressure may be used for fine tuning of the cell frequency. When two cells are used to generate a circular scan, as will be described subsequently, if the two cells are not tuned to an identical frequency an elliptical figure will be generated. To perform fine tuning, the presure of one cell may be increased or decreased until the output results in a circle.

By employing two deflection cells, one horizontal and the other vertical as shown in FIGURE 1, the cells being driven from the same ultrasonic power oscillator with a 90° phase shift between them, a circular scan can be generated. This scan can then be made to spiral by modulating the driving power, i.e., the amplitude of the sonic wave, at a substantially lower frequency than the ultrasonic frequency and thereby provide two-dimensional area coverage.

FIGURE 5 is a block diagram of an optical imaging system utilizing the novel cells of this invention. An intense collimated beam of light is generated by laser 50, and then condensed to the maximum diameter which can be accommodated by the scanning cells without loss in resolution. The laser beam is deflected in two orthogonal directions by means of vertical cell 52 and horizontal cell 54, the cells being driven by means of ultrasonic oscillator 56. The output of oscillator 56 is amplitude modulated by low frequency modulator 58, and the modulated signal is fed directly to the horizontal cell 54, and shifted in phase 90° by phase shifter 60 before being fed to vertical cell 52.

The deflected laser beam scans a target 62, and as the beam traverses the target area, the radiation from a particular small area covered by the laser beam at a particular instant of time is scattered into a large solid angle. A portion of this scattered radiation is collected by a receiver 64 which then focuses the radiation on a detector 66. At the detector the intensity modulation of the radiation, introduced by the variation in reflectivity of the target area, is converted to a modulated electron current. This electron signal is then amplified at 68 and fed to the intensity control grid of a cathode-ray tube 70. Consequently, the cathode-ray tube electron beam is modulated in accordance with the reflectivity of the target area. To synchronize the relative angular positions of target and cathode-ray tube phosphor image, the scan generator simultaneously transmits drive signals to the cathode-ray tube deflection system and the laser beam deflection cells as shown at X and Y.

Ranging in a laser imaging system may be required. A variation in range within the target area may produce distortion, and the degree of distortion or deviation from a true geometrical reproduction depends upon the sharpness of the range contours. In the case of a spiral scan, a constant range target area is corrected simply by a rotation of the display image since the period for each scan line is constant.

In addition to the laser active optical imaging and search track applications, many other uses of an ultrasonic optical beam deflection system are possible. The ultrasonic scanning technique offers the capability of providing nonmechanical optical scan which may be electronically controlled and programmed at video rates. Advantages of the sonic scan, relative to conventional radar and mechanical scans, include increased resolution, speed and accuracy. Additionally it operates at much lower voltage levels than comparable beam deflection devices. Other areas of useful application include flying spot scanners, pattern recognition devices, computer data display and readout devices, and high resolution mapping, surveillance and target recognition.

While the invention has been described in terms of a specific cell construction, it is obvious that numerous changes and modifications may be made without departing from the scope of the invention.

We claim:
1. An ultrasonic optical beam deflection cell comprising:
   an enclosed chamber containing a transparent medium in a portion thereof, said chamber having at least two apertures in line in the surface thereof for passing a light beam through the portion of the chamber containing said transparent medium,
   a transducer comprising a plurality of segmented elements positioned within said chamber in contact with said medium,
   means for actuating said transducer to generate acoustic waves, said acoustic waves propagating through said medium and producing a standing acoustical wave therein, and
   said acoustical wave producing a density gradient within said medium substantially perpendicular to said apertures.
2. Apparatus as in claim 1 in which said transducer elements have cross-sectional dimensions of less than one-half wavelength of the acoustical wave.
3. Apparatus as in claim 1 in which said transducer has one flat face with a second face composed of said plurality of segmented elements, said flat face being in contact with the medium.
4. Apparatus as in claim 3 and including insulating means separating each of said transducer segmented elements, said transducer being bonded to a surface of said chamber.
5. Apparatus as in claim 4 and including means for varying the pressure of the medium within said chamber to thereby adjust the resonant frequency of said chamber.
6. Apparatus as in claim 5 and including pressure release means connected with said chamber.
7. Apparatus as in claim 3 in which said medium comprises a liquid.

References Cited
UNITED STATES PATENTS 3,305,633    2/1967    Chernoch _____ 178—6.8

OTHER REFERENCES

Wiley: Technical Preview of Next Week's National Electronics Conference (Ultrasonic Control of Lasers), Electronics, vol. 35, No. 10 (Oct. 5, 1962), pp. 39–43.

Giarola et al.: Electroacoustic Deflection of a Coherent Light Beam, Proceedings of the IEEE (August 1963), pp. 1150 and 1151.

JEWELL H. PEDERSEN, *Primary Examiner.*

W. L. SIKES, *Assistant Examiner.*